United States Patent
Saremi (10) Patent No.: US 9,088,825 B2
(45) Date of Patent: Jul. 21, 2015

(54) CLIENT DEVICE WITH APPLICATION STATE TRACKING AND METHODS FOR USE THEREWITH

(71) Applicant: Thomas Jefferson Saremi, Mississauga, CA (US)

(72) Inventor: Thomas Jefferson Saremi, Mississauga, CA (US)

(73) Assignee: Morega Systems, INC, Mississauga (CA)

( * ) Notice: Subject to any disclaimer, the term of this patent is extended or adjusted under 35 U.S.C. 154(b) by 7 days.

(21) Appl. No.: 13/732,550

(22) Filed: Jan. 2, 2013

(65) Prior Publication Data

US 2014/0157425 A1    Jun. 5, 2014

Related U.S. Application Data

(60) Provisional application No. 61/732,547, filed on Dec. 3, 2012.

(51) Int. Cl.
*H04L 29/06* (2006.01)
*H04N 21/4627* (2011.01)

(52) U.S. Cl.
CPC ............ *H04N 21/4627* (2013.01); *H04L 63/10* (2013.01); *H04L 63/12* (2013.01)

(58) Field of Classification Search
None
See application file for complete search history.

(56) References Cited

U.S. PATENT DOCUMENTS

| | | | |
|---|---|---|---|
| 6,330,670 B1 * | 12/2001 | England et al. | 713/2 |
| 6,389,538 B1 * | 5/2002 | Gruse et al. | 713/194 |
| 7,024,393 B1 * | 4/2006 | Peinado et al. | 705/59 |
| 7,083,095 B2 * | 8/2006 | Hendrick | 235/451 |
| 7,116,969 B2 * | 10/2006 | Park | 455/410 |
| 7,836,511 B2 * | 11/2010 | Hydrie et al. | 726/27 |
| 2002/0077986 A1 * | 6/2002 | Kobata et al. | 705/52 |
| 2002/0198846 A1 * | 12/2002 | Lao | 705/54 |
| 2003/0233462 A1 * | 12/2003 | Chien | 709/229 |
| 2005/0114896 A1 * | 5/2005 | Hug et al. | 725/88 |
| 2005/0246282 A1 * | 11/2005 | Naslund et al. | 705/52 |
| 2010/0281253 A1 * | 11/2010 | Bourne et al. | 713/156 |

* cited by examiner

*Primary Examiner* — Ellen Tran
*Assistant Examiner* — Wasika Nipa
(74) *Attorney, Agent, or Firm* — Garlick & Markison; Bruce E. Stuckman (57) ABSTRACT

A client device includes a network interface that is coupled to receive media content via a network, wherein the media content is protected by digital rights management data. A processing device executes a digital rights management application for validating playback of media content based on state tracker data. A memory stores the media content, the digital rights management application, the digital rights management data and the state tracker data. The digital rights management application generates the state tracker data based on digital rights management data and state data of the digital rights management application.

12 Claims, 5 Drawing Sheets

CLIENT DEVICE WITH APPLICATION STATE TRACKING AND METHODS FOR USE THEREWITH

CROSS REFERENCES TO RELATED APPLICATIONS

The present application claims priority under 35 U.S.C. 119 to the provisionally filed application entitled, CLIENT DEVICE WITH SECURE CLOCK AND APPLICATION STATE TRACKING AND METHODS FOR USE THEREWITH, having application Ser. No. 61/732,547, filed on Dec. 3, 2012; the contents of which are incorporated herein by reference thereto.

TECHNICAL FIELD OF THE INVENTION

The present invention relates to digital rights management applications used in client devices to protect media content.

DESCRIPTION OF RELATED ART

The number of households having multiple television sets is increasing, and many users want the latest and greatest video viewing services. As such, many households have satellite receivers, cable set-top boxes, and televisions, et cetera, that provide access to broadcast video services. For in-home Internet access, each computer or Internet device can have its own Internet connection. As such, each computer or Internet device includes a modem. As an alternative, an in-home wireless local area network may be used to provide Internet access and to communicate multimedia information to multiple devices within the home. In such an in-home local area network, each computer or Internet device includes a network card to access an IP gateway. The gateway provides the coupling to the Internet. As an alternative to broadcast video, the Internet provides access to downloaded and streaming video services. Instead of broadcasting all programming to every customer, each customer receives only those programs that they want, when they want them.

Certain media content, such as movies, songs, and music albums can be protected by digital rights management techniques that are meant to restrict unlicensed copying of copyrighted materials. For instance, music compact disks (CDs), video cassettes and digital video disks (DVDs) are recorded with copy protection signals that are meant to prevent the media content contained on these media from being copied.

Video signals are frequently scrambled during transmission in order to protect the content from unauthorized reception and viewing. An authorized viewer is provided an encryption key that is used to descramble the video content for playback. Downloaded video content can be subject to a license that allows the video to be played only a limited number of times or for only a limited time, such as a day or a week.

The limitations and disadvantages of conventional and traditional approaches will become apparent to one of ordinary skill in the art through comparison of such systems with the present invention.

DETAILED DESCRIPTION OF THE INVENTION INCLUDING THE PRESENTLY PREFERRED EMBODIMENTS

Figure 1:
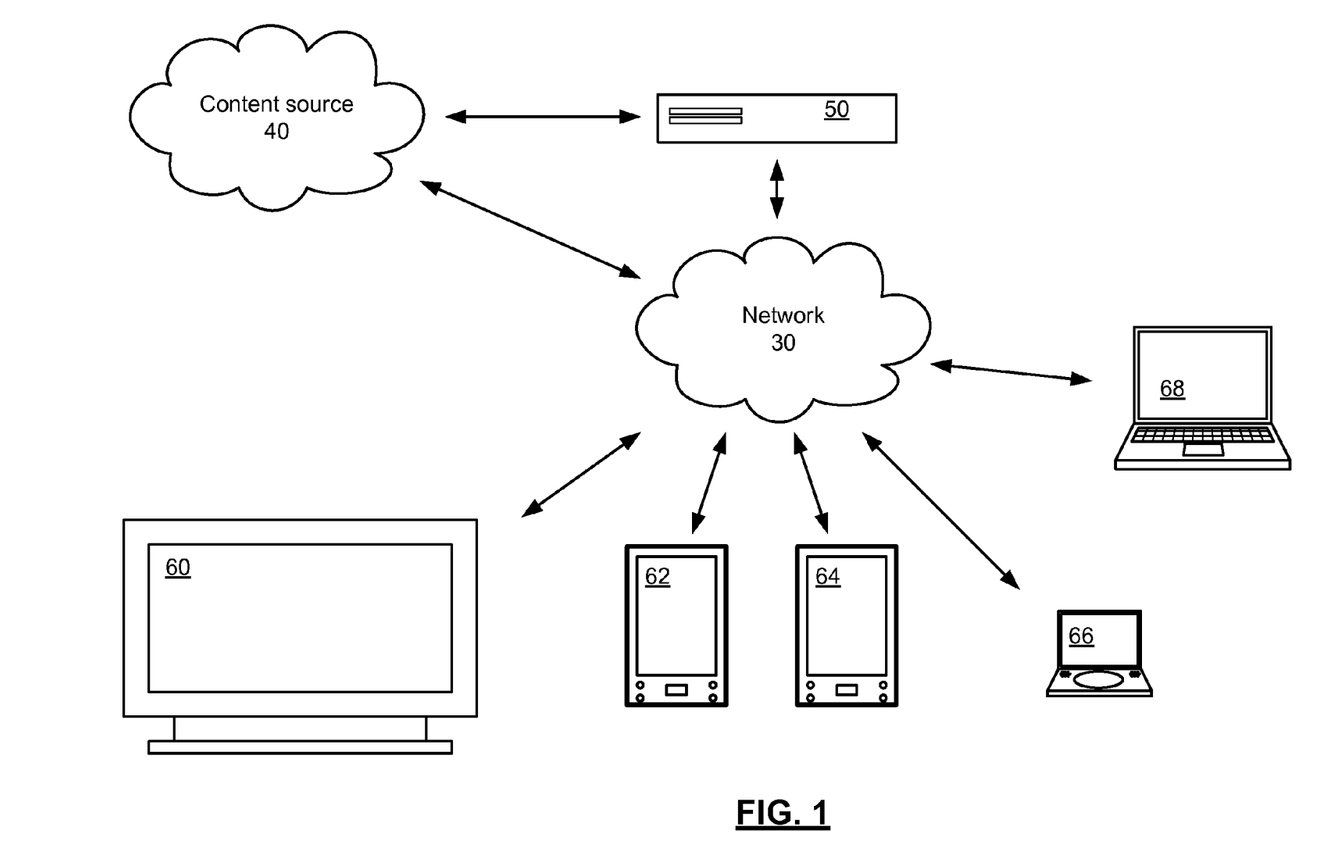
FIG. 1 presents a pictorial representation of a content distribution system that in accordance with an embodiment of the present invention.

FIG. 1 presents a pictorial representation of a content distribution system in accordance with an embodiment of the present invention. In particular, a video server 50 such as a streaming video server, a server of video downloads or other video server is capable of accessing and distributing content from one or more video sources 40 to a plurality of client devices such as a television 60, smart phone, internet tablet or other personal media players 62 and 64, handheld video player 66, and personal computer 68. While specific client devices are shown, video server 50 is capable of accessing and distributing content from one or more video sources 40 to other client devices that can receive and reproduce media content. In addition or in the alternative, client devices can access video content from one or more video sources 40 via network 30.

In the example shown, the video source or sources 40 are external to the system and coupled to the video server 50 to provide coded audio-video streams via a secure channel, such as a secure socket layer (SSL) connection, a private network, a virtual private network or other secure connection. The video source or sources 40 can have two types of content: live and pre-recorded. The video source 40 can be a live video source such as a broadcast cable network, a broadcast satellite network, a broadcast television network, an IP television distribution system, a broadcast mobile network, a video conferencing service or other source of live video. Example of video sources 40 of prerecorded content include a video on demand source such as a YouTube, Hulu, Netflix, Amazon, Blockbuster or other video source, a cable or IP television video on demand network, a digital video recorder, UPnP media server, camcorder, personal computer or other source of stored video.

Client devices 60, 62, 64, 66 and 68 include a digital rights management application that operates in accordance with one or more features of the present invention described further in conjunction with FIGS. 2-5 that follow.

Figure 2:
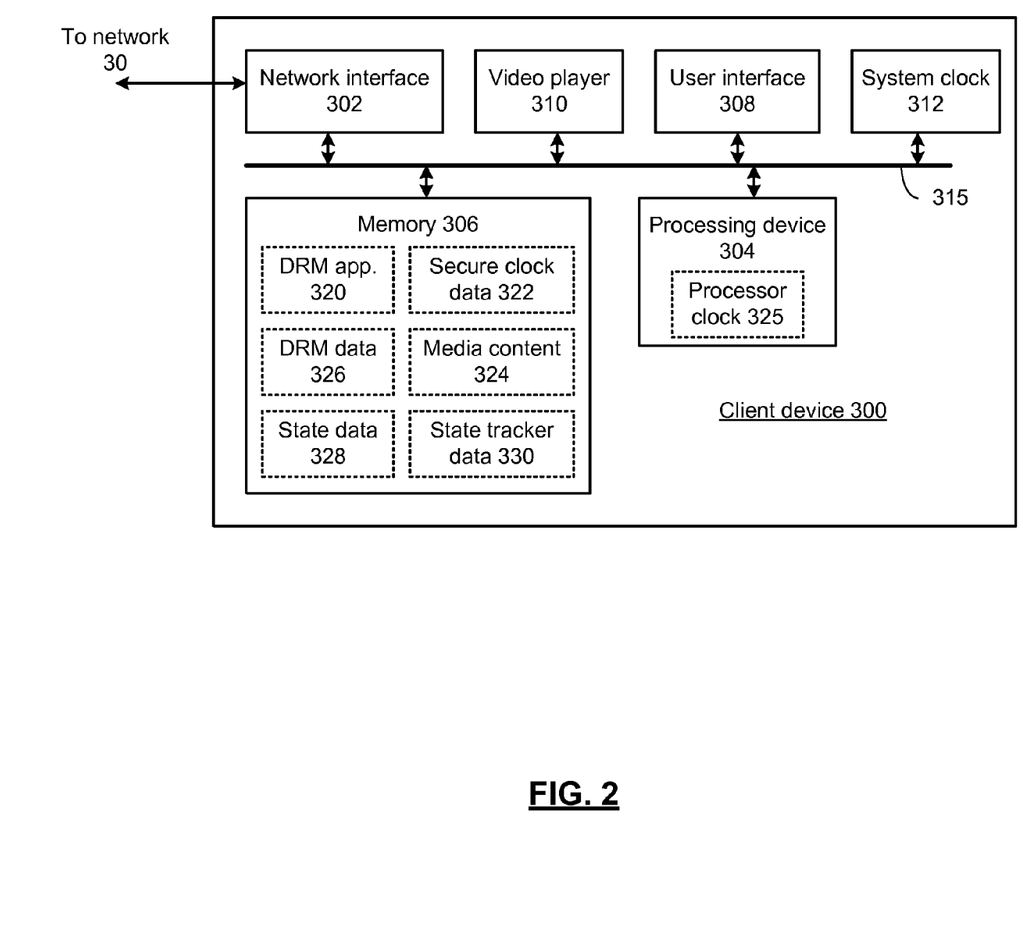
FIG. 2 presents a block diagram representation of client device 300 in accordance with an embodiment of the present invention.

FIG. 2 presents a block diagram representation of a client device 300 in accordance with an embodiment of the present invention. In particular a client device 300 is presented such as a client device 60, 62, 64, 66, 68 or other client devices.

Client device 300 includes a network interface 302 to bidirectionally communicate via network 30, a processing device 304, a memory 306, and a system clock 312. The video player 310 operates in response to commands of a user received via a user interface 308 such as a touch screen, remote control device or other device to receive, download and/or stream media content via the network interface 302 and to play the media content via a display device included in user interface 308 or to an external display device connected to client device 300 (that is not specifically shown). While described above as a video player 310, any media player can be used in a similar fashion.

The network interface 302 can include a modem, transceiver or other network interface adaptor for coupling to the network 30 either directly or indirectly via a serial or parallel connection such as an Ethernet connection, Universal Serial Bus (USB) connection, an Institute of Electrical and Electronics Engineers (IEEE) 1394 (Firewire) connection, small computer serial interface (SCSI), high definition media interface (HDMI) connection or other wired connection that operates in accordance with either a standard or custom interface protocol. In addition or in the alternative, the network interface 302 can include a wireless link for coupling to the network 30 either directly or indirectly through one or more devices that operate in accordance with a wireless network protocol such as 802.11a,b,g,n (referred to generically as 802.11x), Bluetooth, Ultra Wideband (UWB), 3G wireless data connection, 4G wireless data connection or other wireless connection that operates in accordance with either a standard or custom interface protocol.

The processing device 304 can be implemented via one or more processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in memory 306. The memory can include a hard disc drive or other disc drive, read-only memory, random access memory, volatile memory, non-volatile memory, static memory, dynamic memory, flash memory, cache memory, and/or any device that stores digital information. Note that when the processing device 304 implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is shown that includes bus 315, other architectures with additional buses and/or direct connectivity between the modules of client device 300 can also be implemented. Further, client device 300 can include other modules such as a device interface, a battery and other functional elements that are not specifically shown.

In operation, the network interface 302 is coupled to receive media content 324 via network 30. The media content 324 is protected by digital rights management (DRM) 326 data that can be received in association with the media content 324. The processing device 304 executes a digital rights management application 320 for validating playback of media content 324 based on the digital rights management data 326. In typical DRM applications, calculating an accurate time can be of extreme importance. The current time is needed, for example, in calculating expiration times for protected content licenses and in ensuring freshness of keys and other secrets. The network interface 302 is coupled to receive server time data, via network 30, from video server 50 or a separate time server via existing mechanisms such as secure network time protocol (NTP) or other source of secure time. Many client devices 300 however, such as mobile devices, cannot be relied upon to be always on or be always connected to the network 30. As such, existing mechanisms such as secure NTP cannot be solely relied upon since they require frequent and steady communication, through the Internet, to time servers. Processing devices such as processing device 304 frequently include a processor clock, however, this processor clock general outputs timing data, but does not generate an indication of real current time. Client device 300 includes a system clock 312 that generates an indication of real time, however, this real time may not be secure. In particular, the system clock 312 may be subject to user control and can be manipulated to defeat DRM timing constraints.

In an embodiment of the present invention, the DRM application 320 generates secure clock data 322 and validates playback of media content 324 and/or other DRM functions further based on this secure clock data. In particular, the processor clock 325 generates processor clock data and the system clock 312 generates system clock data. The digital rights management application 320 generates secure clock data 322 based on server time data received via network 30, the system clock data and the processor clock data.

The operation of DRM application 320 in generating the secure clock data 322 can illustrated in conjunction with the following example. When the DRM application 320 makes a connection to a secure (time) server, server time data that indicates the value of the server's clock is received and stored in memory 306. This server time data is considered the most trusted value and the most accurate value in the determination of current time. As time elapses, the accuracy of the server's last saved time diminishes also. To compensate for that, the application DRM application 320 registers itself to receive processor clock data in the form of periodic CPU ticks (or time units) from the processor clock 325. This value is available in most operating systems that could be employed by processing device 304. This processor clock data may be merely a monotonically-increasing number that is reset each time the system is restarted. The processor clock data is periodically (such as each few seconds) stored as an elapsed processor clock time. Upon each application restart, the processor clock data will start from zero and its value gets added to the stored elapsed processor clock time. While the application is running, the combination of the elapsed processor clock time and the last saved server time indicate the current time:

$$\text{Current time} = (\text{last saved server time}) + (\text{elapsed processor clock time})$$

However, having these two values (last saved server time, elapsed processor clock time) still cannot predict the current time reliably. The time elapsed between the mobile device restarts or the application restarts are not counted in. So at best, the calculated current time would be from the viewpoint of the running application. The system time data can be used to correct for restarts. The system time data is obtained periodically from the system clock 312 via, for example, the operating system and can be stored in memory 306. While the system time data may not be trustworthy, the DRM application 320 operates instead based on a difference in system time data values. Upon restart, the application calculates a new value for a system time delta as follows:

$$\text{system time delta} = (\text{current system time}) - (\text{last saved system time})$$

Knowing the system time delta, the application can estimate the current time as:

$$\text{current time} = (\text{last saved server time}) + (\text{elapsed processor clock time}) + (\text{system time delta})$$

The system time delta can be used by the DRM application 320 for other purposes. For example, the DRM application 320 can analyze the system time delta to detect tampering. The value of the system time delta can be compared to a system time delta threshold such as zero or other threshold that separates allowed clock timing adjustments from improper changes in the system time. If a user or other adversary tries to roll back the system time, possibly to extend the viewing license of a DRM content item or to delay communications to the server, the DRM application 320 will be able to detect this condition. Under this condition, the current system time would fall in the past relative to the last saved system time and as such would not be trusted. When the system time delta compares unfavorably to the system time delta threshold, the DRM application 320 can simply ignore the new system time or take more drastic steps such as to invalidate playback of media content, disable the video player 310, etc.

In an embodiment of the present invention, the secure clock data 322 includes the system time delta, the system time delta threshold, the elapsed processor clock time, the last saved server time, the last saved system time, and the current time. The secure clock data 322 is stored in memory 306 for secrecy and integrity. A combination of secret-key encryption and integrity hash can be used to ensure that the adversary cannot directly alter the values of the secure clock data 322 in memory 306. Any tampering with the secure clock data 322 itself renders its values untrusted and the DRM application 320 can, for example, disable operation of the video player, erase other DRM data 326, and/or require a fresh connection to a video server 50 or time server before performing any other operations.

In addition to the secure clock data 322, the DRM application 320 can optionally generate and store state tracker data 330 that is used by the DRM application to test the integrity of the DRM data 326, the media content 324, state data 328 regarding the DRM application and/or the secure clock data 322. In DRM applications, the application state and the stored data can both be important. The state can include state data such as an activation timestamp, time left to renewal of the application, encryption keys, secure clock data 322 and other secrets or protected data. In addition to this information, the DRM application 320 has associated data files such as media content 324 and other DRM data 326 such as license files associated with the media content 324. This information and data typically form a hierarchy of files under the home folder of the user or the installation directory of the DRM application 320. Attacks can be mounted to replace selected sub-sets of the information and data. Removal of state is also a form of state rollback attack. For instance, the protected media file and its license file can both be replaced with different revisions as long as they are used together.

In an embodiment, the state tracker data 330 can include integrity data that represents, for example, an integrity hash of the each of the files associated with the DRM application 320 that is generated whenever these files are stored or modified by the DRM application in a proper way. Before any of these files is retrieved from memory, accessed, executed or otherwise used, a new integrity hash value is calculated for the file by the DRM application 320 and compared to the proper integrity hash value stored in the state tracker data 330. Any tampering or rollback of any of these files can be detected by determining that the new integrity has a value that compares unfavorably to the corresponding integrity hash value stored in the state tracker data 330—i.e. when they do not match. This provides a mechanism to protect the DRM application 320 against partial roll-back attacks or other tampering.

The state tracker data 330 can be encrypted or otherwise securely stored in memory 306. As discussed above, the DRM files are checked prior to being used. Only after proper verification, will usage of the files be allowed. Alteration of any application state or other associated data renders a part or the entire DRM application 320 inoperable. The presence of any file without a corresponding integrity check via the state tracker data 330 can also be considered a breach in application security.

In one example, the DRM application 320 removes the digital rights management data 326 and the state data 328 from memory in response to determining that the state data 328 is invalid. In another example, the DRM application 320 removes the digital rights management data 326 and the state data 328 from memory in response to determining that the DRM data 326 is invalid. Further, upon encountering any inconsistencies, the DRM application 320 may choose to remove all its state data 328, secure clock data 322, media content 324, DRM data 326, state tracker data 330 and revert itself to a pre-activation state. These files may be locked and additional files may be prevented from being stored. This design therefore protects the DRM application 320 against partial or selective rollback attacks. The only condition under which an attack is possible is if the entire storage, including the state tracker data 330, is replaced.

Figure 3:
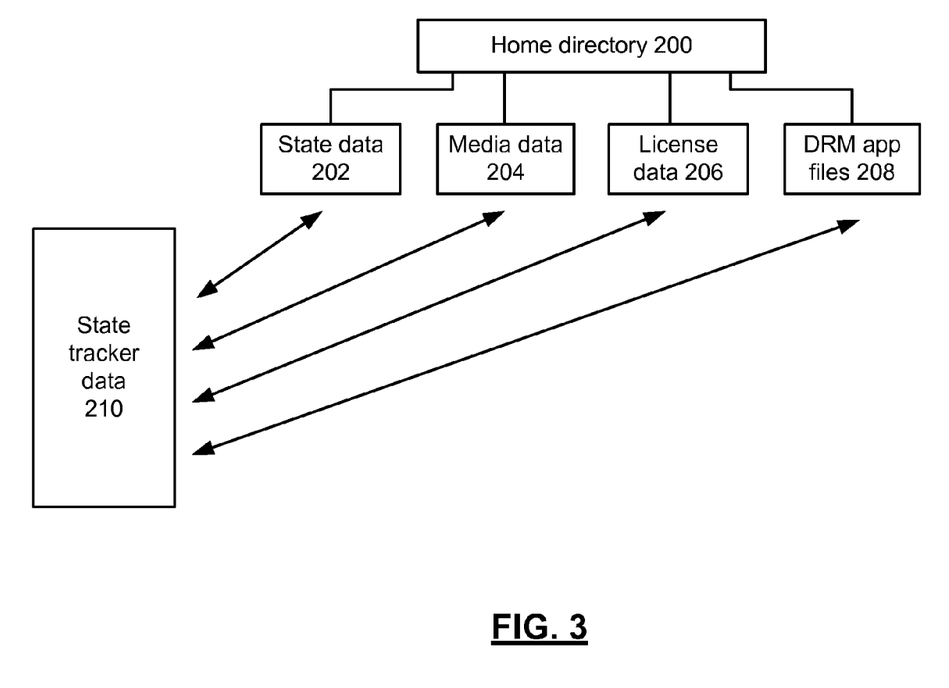
FIG. 3 presents a graphical representation of a hierarchical file structure in accordance with an embodiment of the present invention.

FIG. 3 presents a graphical representation of a hierarchical file structure in accordance with an embodiment of the present invention. In particular, an example hierarchical file structure is presented where a home directory of a DRM application, such as DRM application 320, includes a plurality of files including state data 202 such as state 328 or other state data, media data 204, such as media content 324 or other content data, other DRM data such as license data 206 and DRM application files 208 including programs, utilities and other data used in executing DRM application 320.

While a particular hierarchical file structure is shown, other hierarchical or non-hierarchical file structures can likewise be employed to store the files associated with a DRM application such as DRM application 320.

State tracker data 210 includes integrity data for each of the files of the home directory 200. As discussed in conjunction with FIG. 2, the state tracker data 210, like state tracker data 330, can include integrity data that is generated whenever these files are stored or modified by the DRM application 320 in a proper way. Before any of these files is retrieved from memory, accessed, executed or otherwise used, a new integrity hash value is calculated for the file by the DRM application 320 and compared to the proper integrity hash value stored in the state tracker data 210. Any tampering or rollback of any of these files can be detected by determining that the new integrity has value compares unfavorably to the corresponding integrity hash value stored in the state tracker data 210—i.e. when they do not match. This provides a mechanism to protect the DRM application 320 against partial rollback attacks or other tampering.

Figure 4:
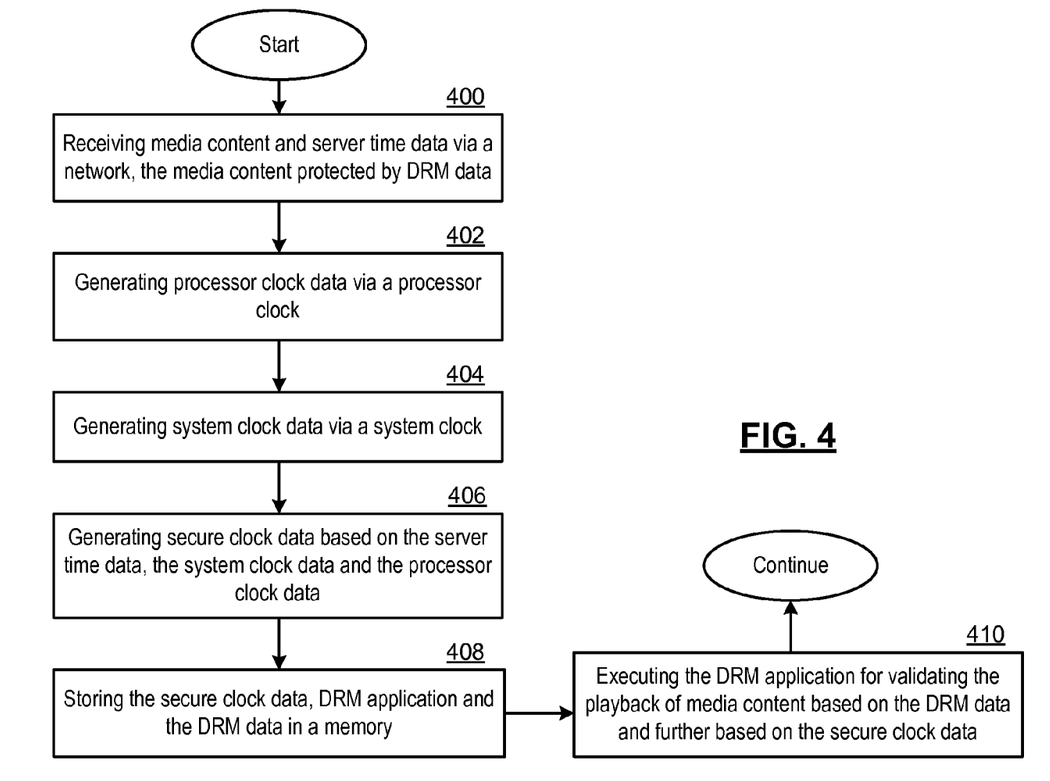
FIG. 4 presents a flowchart representation of a method in accordance with an embodiment of the present invention.

FIG. 4 presents a flowchart representation of a method in accordance with an embodiment of the present invention. In particular a method is shown for use in conjunction with one or more functions and features described in conjunction with FIGS. 1-3. In step 400, media content and server time data are received via a network, the media content protected by digital rights management data. In step 402, processor clock data are generated via a processor clock. In step 404, system clock data are generated via a system clock. In step 406, secure clock data are generated based on the server time data, the system clock data and the processor clock data. In step 408, the secure clock data, the digital rights management application and the digital rights management data are stored in a memory. In step 410, the digital rights management application is executed, validating playback of media content based on the digital rights management data and further based on the secure clock data.

In an embodiment, the secure clock data includes a system time delta generated based on the system time data, an elapsed processor clock time generated based on the processor clock data, a last saved server time generated based on the server time data, and a current time, wherein the current time is generated as the sum of the last server time, the elapsed processor time and the system time delta. The system time delta can indicate a difference between a last saved system time and a current system time. Playback of the media content can be disabled when the system time delta compares unfavorably to a system time delta threshold.

Figure 5:
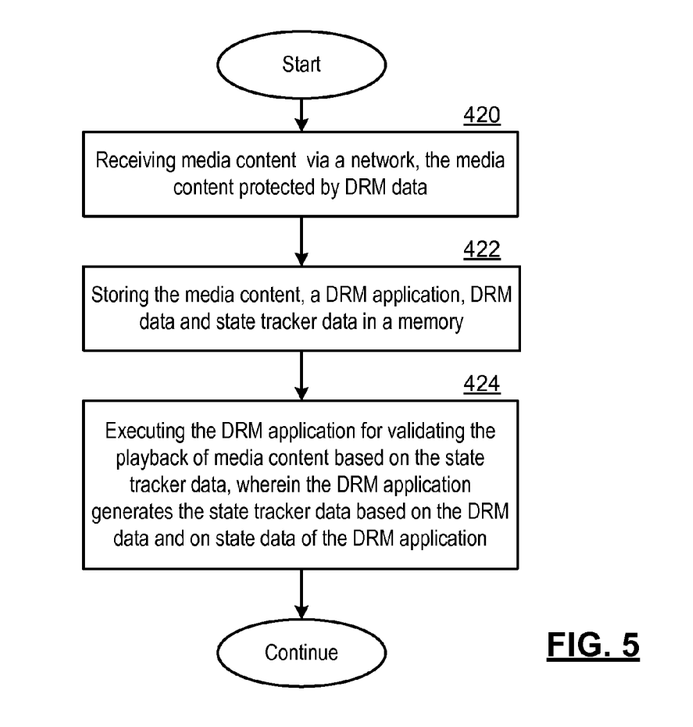
FIG. 5 presents a flowchart representation of a method in accordance with an embodiment of the present invention.

FIG. 5 presents a flowchart representation of a method in accordance with an embodiment of the present invention. In particular a method is shown for use in conjunction with one or more functions and features described in conjunction with FIGS. 1-4. In step 420, media content is received via a network, the media content protected by digital rights management data. In step 422, the media content, a digital rights management application, digital rights management data and state tracker data are stored in a memory. In step 424, a digital rights management application is executed, validating playback of media content based on state tracker data, wherein the digital rights management application generates the state tracker data based on the digital rights management data and state data of the digital rights management application.

In an embodiment, the state tracker data includes integrity data for validating the digital rights management data and the state data. The digital rights management application can determine validity of the digital rights management data and/or state data based on the integrity data, in response to the digital rights management data or state data being retrieved from memory. The digital rights management application can remove the digital rights management data and the state data from memory in response to determining that either the digital rights management data or the state data is invalid.

The memory can store the media content, the digital rights management application, the digital rights management data and the state tracker data in a hierarchical file structure. The state data can include an activation timestamp and/or a time to renewal of the digital rights management application. The digital rights management data can include the media content and a license file associated with the media content.

In preferred embodiments, optional circuit components can be implemented using 0.35 micron or smaller CMOS technology. Provided however that other circuit technologies, both integrated or non-integrated, may be used within the broad scope of the present invention.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "coupled". As one of ordinary skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As the term module is used in the description of the various embodiments of the present invention, a module includes a functional block that is implemented in hardware, software, and/or firmware that performs one or module functions such as the processing of an input signal to produce an output signal. As used herein, a module may contain submodules that themselves are modules.

Thus, there has been described herein an apparatus and method, as well as several embodiments including a preferred embodiment, for implementing a media distribution system. While described primarily in terms of video programming, it is understood that the video programming can include associated audio and that the present invention could likewise to be applied to associated audio or the distribution of audio programming that is unassociated with video. Various embodiments of the present invention herein-described have features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

The invention claimed is:

1. A client device comprising:
a network interface, coupled to receive media content via a network, the media content protected by digital rights management data;
a processing device, coupled to the network interface, for executing a digital rights management application for validating playback of media content based on state tracker data; and
a memory, coupled to the processing device, for storing the media content, the digital rights management application, the digital rights management data and the state tracker data;
wherein the digital rights management application generates the state tracker data based on the digital rights management data and state data of the digital rights management application that includes at least one of: application activation time data that indicates an activation time of the DRM application, or application renewal data associated with a renewal date of the DRM application; and
wherein the state tracker data includes integrity data indicating integrity of the digital rights management data and the state data, wherein the digital rights management application determines validity of the digital rights management data based on the integrity data, in response to the digital rights management data being retrieved from memory, and automatically removes the digital rights management data and the state data from memory in response to determining that the digital rights management data is invalid.

2. The client device of claim 1 wherein the digital rights management application determines validity of the state data based on the integrity data, in response to the state data being retrieved from memory; and     wherein the digital rights management application removes the digital rights management data and the state data from memory in response to determining that the state data is invalid.

3. The client device of claim 1 wherein the memory stores the media content, the digital rights management application, the digital rights management data and the state tracker data in a hierarchical file structure.

4. The client device of claim 1 wherein the state data includes an activation timestamp.

5. The client device of claim 1 wherein the state data includes a time to renewal of the digital rights management application.

6. The client device of claim 1 wherein the digital rights management data includes the media content and a license file associated with the media content.

7. A method for use in a client device, the method comprising:

receiving media content via a network, the media content protected by digital rights management data;

storing the media content, a digital rights management application, the digital rights management data and state tracker data in a memory; and     executing a digital rights management application for validating playback of media content based on state tracker data, wherein the digital rights management application generates the state tracker data based on the digital rights management data and state data of the digital rights management application that includes at least one of: application activation time data that indicates an activation time of the DRM application, or application renewal data associated with a renewal date of the DRM application; and     wherein the state tracker data includes integrity data indicating integrity of the digital rights management data and the state data, wherein the digital rights management application determines validity of the digital rights management data based on the integrity data, in response to the digital rights management data being retrieved from memory, and automatically removes the digital rights management data and the state data from memory in response to determining that the digital rights management data is invalid.

8. The method of claim 7 wherein the digital rights management application determines validity of the state data based on the integrity data, in response to the state data being retrieved from memory; and     wherein the digital rights management application removes the digital rights management data and the state data from memory in response to determining that the state data is invalid.

9. The method of claim 7 wherein the memory stores the media content, the digital rights management application, the digital rights management data and the state tracker data in a hierarchical file structure.

10. The method of claim 7 wherein the state data includes an activation timestamp.

11. The method of claim 7 wherein the state data includes a time to renewal of the digital rights management application.

12. The method of claim 7 wherein the digital rights management data includes the media content and a license file associated with the media content.

* * * * *